(12) United States Patent
Lang et al.

(10) Patent No.: US 7,837,418 B2
(45) Date of Patent: Nov. 23, 2010

(54) TWIST DRILL

(75) Inventors: Wolfgang Lang, Wernberg-Köblitz (DE); Günter Schreiner, Wernberg-Köblitz (DE)

(73) Assignees: Kennametal Inc., Latrobe, PA (US); Bayerische Motoren Werke Aktiengesellschaft, Munich (DE)

( * ) Notice: Subject to any disclaimer, the term of this patent is extended or adjusted under 35 U.S.C. 154(b) by 1073 days.

(21) Appl. No.: 11/532,232

(22) Filed: Sep. 15, 2006

(65) Prior Publication Data
US 2007/0237594 A1    Oct. 11, 2007

Related U.S. Application Data (63) Continuation-in-part of application No. PCT/EP2005/002187, filed on Mar. 2, 2005.

(51) Int. Cl.
*B23B 51/02* (2006.01)
(52) U.S. Cl. ........................... 408/230; 408/227
(58) Field of Classification Search ............... 408/144, 408/145, 227, 230; *B23B 51/00, 51/02*
See application file for complete search history.

(56) References Cited

U.S. PATENT DOCUMENTS

| | | | |
|---|---|---|---|
| 3,387,511 A | | 6/1968 | Ackart, Sr. et al. |
| 4,583,888 A * | | 4/1986 | Mori et al. .................. 408/59 |
| 4,756,650 A * | | 7/1988 | Wakihira et al. ............ 408/230 |
| 4,898,503 A * | | 2/1990 | Barish ........................ 408/230 |
| 5,230,593 A * | | 7/1993 | Imanaga et al. ............. 408/230 |
| 5,350,261 A * | | 9/1994 | Takaya et al. ............... 408/229 |
| 5,678,960 A | | 10/1997 | Just et al. |
| 5,716,170 A * | | 2/1998 | Kammermeier et al. ..... 408/145 |
| 7,306,411 B2 * | | 12/2007 | Mabuchi et al. ............ 408/230 |
| 2002/0046629 A1 * | | 4/2002 | Borschert et al. .......... 76/108.1 |
| 2003/0053873 A1 | | 3/2003 | Shaffer |
| 2003/0215297 A1 | | 11/2003 | Frisendahl |

FOREIGN PATENT DOCUMENTS

| | | |
|---|---|---|
| EP | 0 761 352 A | 3/1997 |
| FR | 2 433 996 A | 3/1980 |

(Continued)

OTHER PUBLICATIONS

International Search Report PCT/EP2005/002187.

*Primary Examiner*—Daniel W Howell
(74) *Attorney, Agent, or Firm*—Larry R. Meenan (57) ABSTRACT

Twist drill with a drill shaft and a cutting part that extends to a drill tip, with spiral chip flutes along the cutting part that form a drill core, wherein the drill diameter and/or core thickness diminish or taper from the drill tip toward the shaft. The abstract of the disclosure is submitted herewith as required by 37 C.F.R. §1.72(b). As stated in 37 C.F.R. §1.72(b): A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims. Therefore, any statements made relating to the abstract are not intended to limit the claims in any manner and should not be interpreted as limiting the claims in any manner.

19 Claims, 6 Drawing Sheets

FOREIGN PATENT DOCUMENTS

| | | | | |
|---|---|---|---|---|
| JP | 63 260713 A | | | 10/1988 |
| JP | 02109620 A | * | | 4/1990 |
| JP | 02232111 A | * | | 9/1990 |
| JP | 07040119 A | * | | 2/1995 |
| JP | 2001096414 A | * | | 4/2001 |
| JP | 2001225216 A | * | | 8/2001 |
| JP | 2002126925 A | * | | 5/2002 |

\* cited by examiner

$$R_a = \frac{1}{l_m} \int_{x=0}^{x=l_m} |y| dx$$

$$\sum A_{oi} - \sum A_{ui}$$

$$A_g - \sum A_{oi} = \sum A_{ui}$$

TWIST DRILL

CONTINUING APPLICATION DATA

This application is a Continuation-In-Part application of International Patent Application No. PCT/EP2005/002187, filed on Mar. 2, 2005, which claims priority from Federal Republic of Germany Patent Application No. 20 2004 004 287.8, filed on Mar. 17, 2004. International Patent Application No. PCT/EP2005/002187 was pending as of the filing date of this application. The United States was an elected state in International Patent Application No. PCT/EP2005/002187.

BACKGROUND

1. Technical Field

This application relates to a twist drill, in particular for machining wrought aluminum alloys, with a drill shaft and a cutting part that extends to a drill tip, along which spiral chip flutes are provided, forming a drill core.

2. Background Information

In the machining of wrought aluminum alloys, e.g. AlMgSi1 or AlMgSi0.5, the use of conventional tools or twist drills can lead to a significantly restricted useful life of the tool, for example if the drill becomes jammed or stuck in the boring. Even the use of oils or lubricants that contain oils does not produce a satisfactory result, in addition to the fact that the use of such lubricants to extend the useful life of the tool is not always possible when the tools are used in the construction of automobile body parts. The reason is that the body work must be as clean as possible for subsequent welding and/or painting work as well as adhesive work, and a cleaning process prior to the further processing of the body parts is not always possible for cost and space reasons.

OBJECT OR OBJECTS

The object of at least one possible embodiment in is to create a twist drill of the type described above that can also be used for the machining of wrought aluminum alloys. The purpose of at least one possible embodiment is to make it possible to remove metal from this material in a series process at a boring depth which is in particular approximately 5 times the diameter of the boring tool.

SUMMARY

In accordance with at least one possible embodiment, it is taught that this object can be accomplished by a twist drill, in particular for the machining of wrought aluminum alloys, with a drill shaft and a cutting part that extends to a drill tip, with spiral chip flutes along the cutting part that form a drill core, with a core thickness at the drill tip of (15±3)% of the drill diameter, with a tapering of the core thickness from the drill tip toward the shaft, and with a primary clearance angle of (19±3)° and a secondary clearance angle of (26±4)°. Alternatively, in accordance with at least one possible embodiment, it is taught that this object can be accomplished by a twist drill, in particular for the machining of wrought aluminum alloys, with a drill shaft and a cutting part that extends to a drill tip, with spiral chip flutes along the cutting part that form a drill core, with a core thickness at the drill tip of (15±3)% of the drill diameter, with a tapering of the drill diameter from the drill tip toward the shaft, and with a primary clearance angle of (19±3)° and a secondary clearance angle of (26±4)°.

The tapering of the core thickness, or of the drill or cutting diameter of the twist drill, is 0.5 mm to 0.9 mm, preferably 0.8 mm, with reference to a 100 mm drill length. A particularly preferred primary clearance angle is 18°, while a preferred secondary clearance angle is 25°. The tip angle of the twist drill is advantageously 120°.

According to ISO Standard 5419, the primary or lateral clearance angle is the angle between a flank and a plane which contains the cutting edge and the hypothetical direction of the cutting movement at a selected point on the cutting edge, measured in the plane perpendicular to the radius at the selected point. This angle is measured at the face edge. The secondary or standard or normal clearance angle is the angle between a primary flank and a plane which contains the cutting edge and the hypothetical direction of the cutting direction at the selected point on the cutting edge, measured in the plane perpendicular to the cutting edge at the selected point.

In one advantageous configuration, the twist drill advantageously has two internal cooling borings which emerge in the vicinity of the drill tip in the primary clearance faces. The spiral or twist angle of the chip flutes is approximately 30°. With this geometry, which is particularly suitable for drill diameters greater than 6 mm, two internal cooling borings are advantageously provided. With a likewise advantageous spiral or twist angle of approximately 40°, there are advantageously no internal cooling borings. This geometry is particularly suitable for twist drills with a drill diameter of less than or equal to 6 mm.

In one particularly preferred configuration, the surfaces of the cutting part of the twist drill are initially ground to an average roughness of $R_A \cong 0.2$. Then the corresponding surfaces are precision ground to an average roughness of $R_A \leq 0.1$. The precision grinding is preferably executed both in the chip flutes as well as on the primary and secondary clearance faces and the circular lands of the cutting part.

The above mentioned surfaces, i.e. the chip flutes, the clearance faces and/or the circular lands of the twist drill are advantageously coated, whereby preferably a diamond-like carbon coating (DLC or Balinit® Triton coating manufactured by Balzers) is provided.

In an additional advantageous configuration, the land width of the cutting land measured in the vicinity of the drill tip is 50%, but preferably less than 50% of the drill diameter.

The advantages achieved with at least one possible embodiment consist in particular of the fact that with a twist drill having the geometry described above and a coating of the above mentioned drill surfaces, it becomes possible to cut wrought aluminum alloys in a series process at a drilling depth of at least 5 times the drill diameter essentially without the drill becoming stuck or jammed. The wear on the drill is thereby significantly reduced and a long useful life is achieved. A particularly short machining time can also be achieved by an increase in the cutting value.

The above-discussed embodiments of the present invention will be described further hereinbelow. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

DESCRIPTION OF EMBODIMENT OR EMBODIMENTS

Parts that correspond to one another in all the figures are identified by the same reference numbers.

Figure 1:
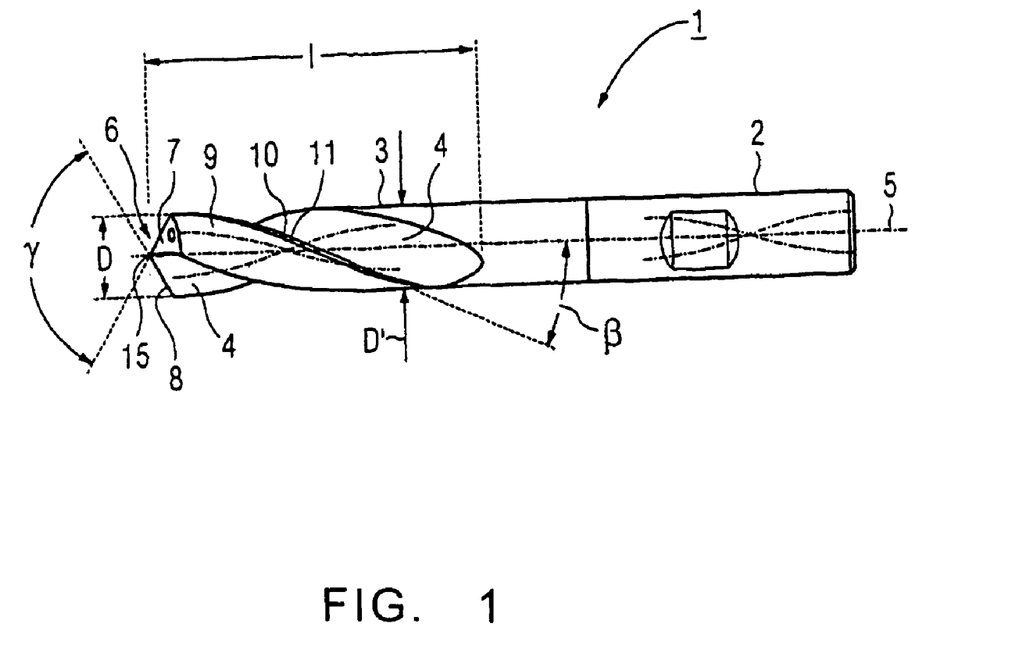
FIG. 1 is a side view of a twist drill according to at least one possible embodiment.

FIG. 1 shows a twist droll 1 with an essentially cylindrical base body which has a shaft 2 and a cutting part 3 with a cutting part length 1. In the cylindrical surface of the droll 1 or its cutting part 3, there are two chip flutes 4 that are diametrically opposite each other. The chip flutes 4 extend in a spiral fashion around the center axis 5 of the droll 1 and emerge in the end surface of the droll 1 which forms the drill tip 6. The center longitudinal axis 5 of the droll 1 is simultaneously its axis of rotation, around which the droll 1 can be rotated during its use.

The twist droll 1 also has two primary clearance faces 7 and two primary cutting faces 8, as well as two secondary clearance faces 9, each of which has a circular land 10 and a secondary cutting face 11. The spiral or twist angle β is preferably (30±3)°, advantageously 30°, or (40±3)°, advantageously 40°. The tip angle γ is preferably (120±1)°.

Figure 2:
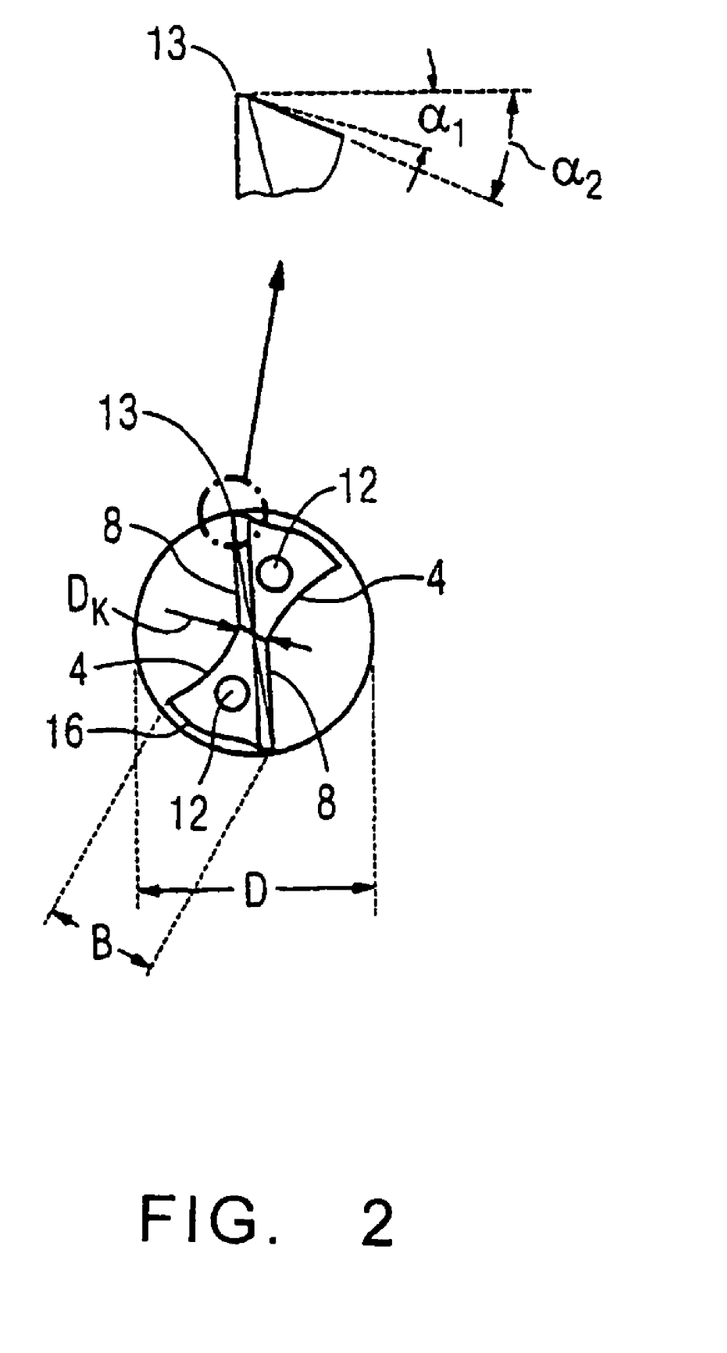
FIG. 2 is a side view of the drill tip and, on a larger scale, a selected point on a cutting edge to show the clearance angle.

The end view in FIG. 2 shows the internal cooling channel borings 12 for a lubricant, which cooling channel borings 12 emerge in the primary clearance faces 7. During the machining of wrought aluminum alloys for a pulse-controlled minimum lubrication, the lubricant is transported via the cooling channel borings 12 and sprayed as a lubricant mist with a high proportion of air on the drilling surface to be cut.

The chip flutes 4 and advantageously also the clearance faces 7 and the circular lands 10 are polished, i.e. precision ground with an average roughness $R_A \leq 0.1$. The surfaces of the cutting part 3 are thereby initially ground to an average roughness of $R_A \cong 0.2$ with a corresponding abrasive grain, e.g. D46. In a subsequent precision grinding step with a corresponding grain, e.g. D20, an average roughness of $R_A \leq 0.1$ is achieved. The chip flutes 4 and the clearance faces 7, 9 and the circular lands 10 are also provided with a coating, advantageously a DLC coating. The designators D46 and D20 denote the approximate mean size in micrometers of diamond grit according to the standards of the Federation of European Producers of Abrasives (FEPA), which is headquartered at 20, Avenue Reille, 75014 Paris, France. For example, D46 denotes larger grit than D20, and thus D46 grit, in at least one possible embodiment, can be used to perform an initial, fine grinding, and then D20 can be subsequently used to perform a final, very fine grinding to achieve a polished surface having low average roughness.

The indicated core diameter $D_k$ of the twist droll 1 is preferably 14% of the drill diameter D, measured at the drill tip 6.

The clearance angles $\alpha_1$, $\alpha_2$ are shown in the enlarged detail illustrated in FIG. 2, which shows a primary cutting edge 13. The primary or lateral clearance angle (primary clearance angle) $\alpha_1$ is thereby preferably 18°, while the secondary or standard clearance angle (secondary clearance angle) $\alpha_2$ is preferably 25°. In one advantageous configuration, the land width B of the cutting land 16 measured on the opposite, descending sides, i.e. on a center line 15 between the cutting edges, is preferably less than 50% of the drill diameter D ($B \leq 0.5 \cdot D$).

As illustrated in FIG. 1, the drill diameter D of the twist droll 1 tapers, beginning from the drill tip 6 to a drill diameter D' toward the shaft 2, so that D' is smaller than D ($D' \leq D$). The preferably continuous tapering of the drill diameter D of the drill 1, beginning from the drill tip 6 or from the center line between the cutting edges 15 is approximately 0.8 mm, with reference to a 100 mm drill length.

Figure 3:
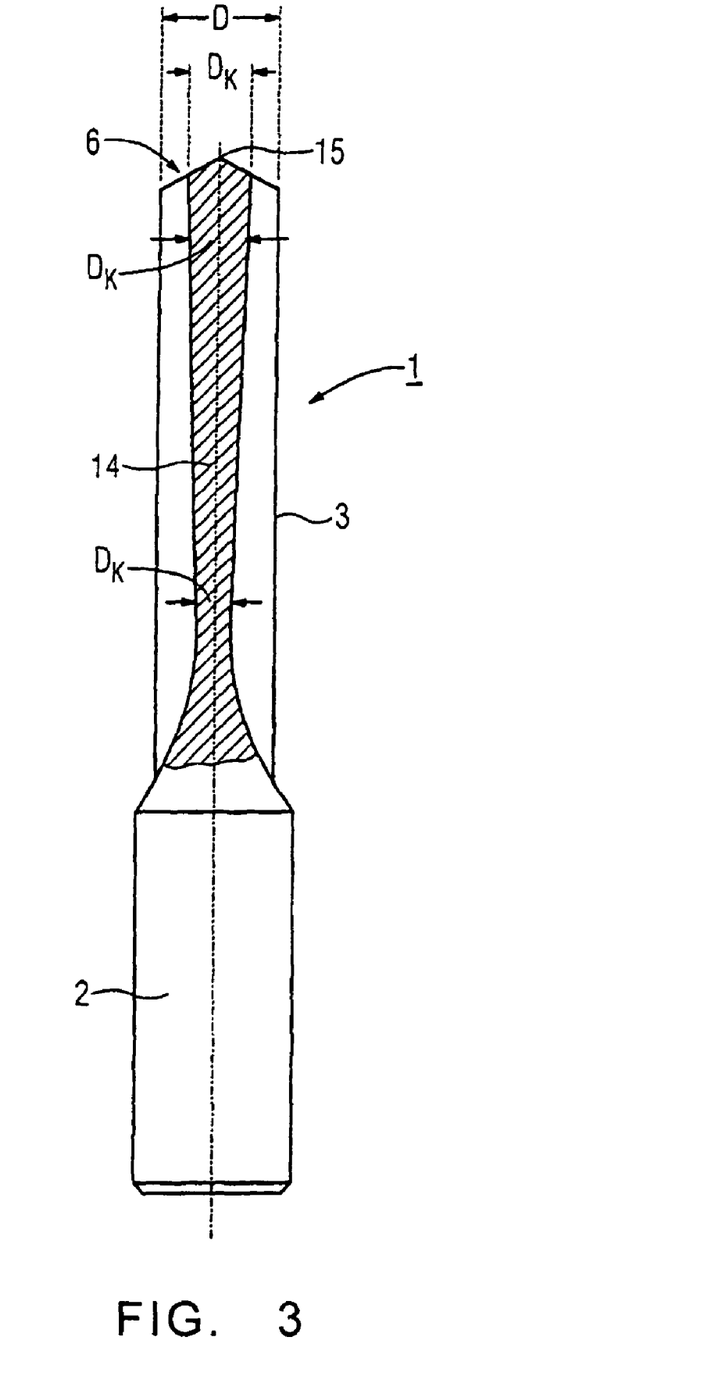
FIG. 3 is a schematic side view of the twist drill illustrated in FIG. 1 with tapering drill diameter and drill core.

As shown in FIG. 3, additionally or alternatively, the core diameter or the core thickness $D_k$ of the drill core 14 preferably tapers continuously toward the shaft 2. The tapering of the core diameter $D_k$ of the drill 1, beginning from the drill tip 6 or from the center line between the cutting edges 15 is also approximately 0.8 mm with reference to a 100 mm drill length.

Figure 4:
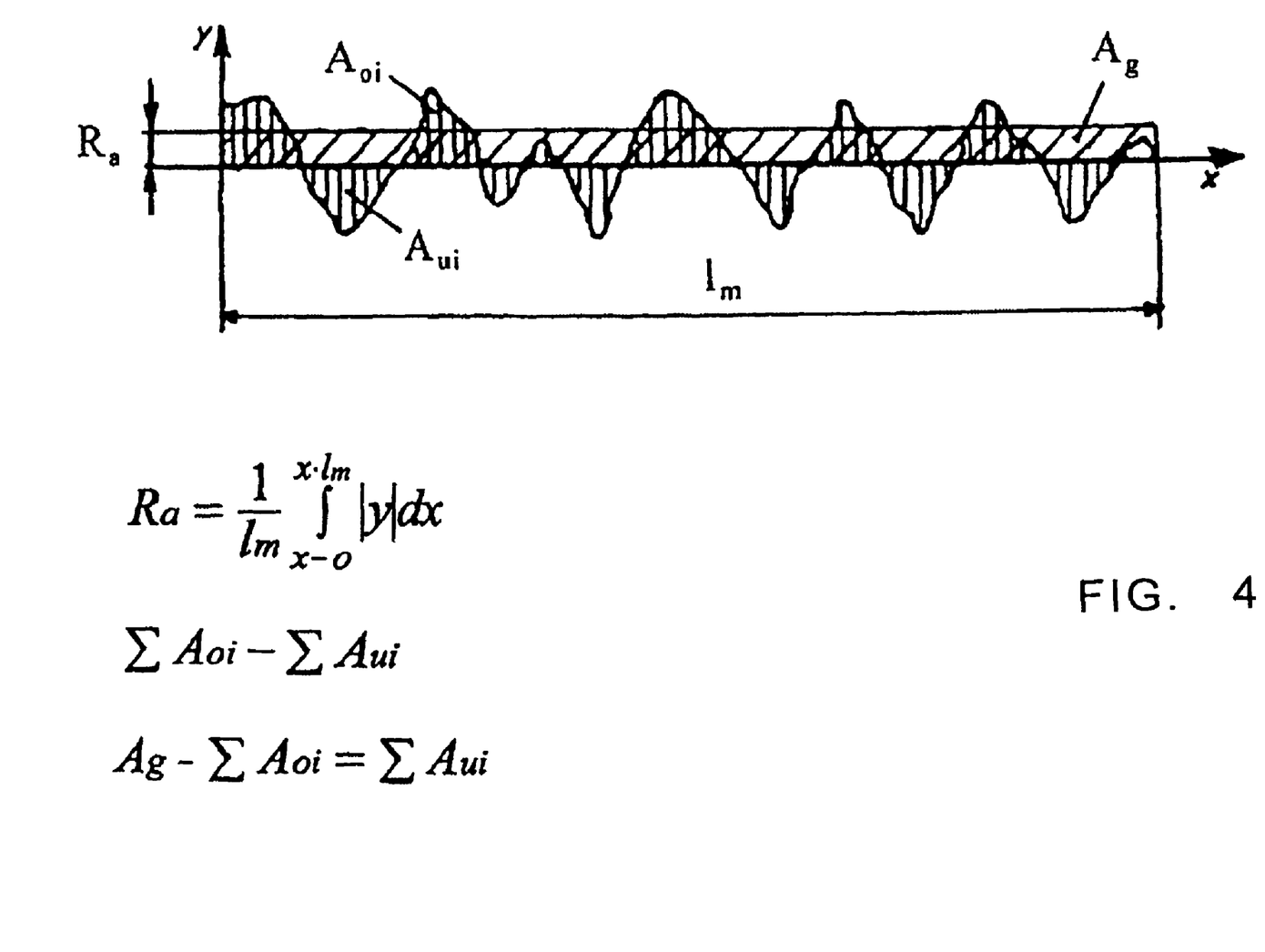
FIG. 4 shows a graph to determine Arithmetic Mean Roughness $R_a$, in accordance with German Industrial Standard (DIN) 4768.

According to yet another possible embodiment of the present invention, the average roughnesses $R_A$ are according to German Industrial Standard (DIN) 4768. An English translation of DIN 4768 is presented herein in its entirety in the quoted portion as follows (note: figure numbers have been added to reference FIGS. 4, 5, and 6 in the application):

"DIN 4768 Determination of Surface Roughness of Parameters $R_a$, $R_z$, and $R_{max}$ by means of Electrical Stylus Instruments—Definitions, measurement requirements (May 1990).

The previous editions of this standard also contained findings by means of two-stage RC filters, although such filters are no longer used in modern measurement devices. The current phase-correction filters can also be used for measurements of waviness. Therefore they were omitted from the subsequent edition of DIN 4768 and are described in a separate standard DIN 4777. The two standards can be properly understood only by reading them in a close relationship with each other.

This standard is valid for the determination of comparable roughness measurements of industrial surfaces with electric stylus instruments with electrical transmission, high-pass filtering and evaluation capabilities. Waviness and shape variances are not the subject of this standard.

DIN 4768 gives definitions and measurement principles for the average roughness $R_a$, the averaged roughness depth $R_z$ and the maximum roughness depth $R_{max}$. The publication of this standard achieves the following advantages over the previous situation:

1. The influence of the outliers on the measurement result is reduced by the determination of the arithmetic mean of the individual roughness depths of five adjacent individual measured sections. The elimination of the outliers thereby becomes a more objective process.
2. If the maximum depth of roughness $R_{max}$ (i.e. the greatest outlier) is required for functional reasons, it must be measured under the same conditions as the averaged depth of roughness $R_z$.

3. The selection of the boundary wavelength of the wave filter must be defined for periodic profiles (turning, planing etc.) by associations with the interval between grooves and on aperiodic profiles (grinding, contour milling etc.) by associations with the expected $R_z$ value.
4. In addition to $R_z$ and $R_{max}$, the measurement conditions for the arithmetic mean roughness $R_a$ are also defined.

DEFINITIONS

Arithmetic mean roughness $R_a$. Arithmetic mean of the absolute values of the distances y of the roughness profile from the center line inside the measured section. This is equivalent to the height of a rectangle, the length of which is equal to the total measured section and which covers the same area as the sum of the surfaces between the roughness profile and the center line (See FIG. 4).

Individual roughness depth $Z_i$ ($Z_i=Z_1$ to $Z_5$). Distance of two parallels to the center line inside the individual measured section which touch the roughness profile at the highest and at the lowest point (see FIG. 5).

Averaged roughness depth $R_z$. Arithmetic average of the individual roughness depths of five individual measured sections adjacent to one another (see FIG. 5).

Maximum roughness depth $R_{max}$: Greatest of the individual roughness depths $Z_i$, e.g. $Z_5$ that occur over the entire measured length $l_m$ (see FIG. 5).

Center line. Line parallel to the general direction of the roughness profile, the line of the shape of the ideal geometric profile that divides the roughness profile so that the sum of the surfaces filled with material above it and of the areas without material below it are equal (See FIG. 4).

Lead section $l_v$. Length of the first part of the scanning section not used for evaluation and projected perpendicularly on the center line (See FIG. 5).

Total measured length $l_m$. Length projected perpendicularly on the center line of the portion of the roughness profile used for the evaluation (See FIG. 5).

Individual measurement section $l_e$: One-fifth of the total measured length $l_m$ (See FIG. 5).

Trailing length $l_n$. Length projected perpendicularly on the center line of the final portion of the scanned length and not used for the evaluation (See FIG. 5).

Figure 5:
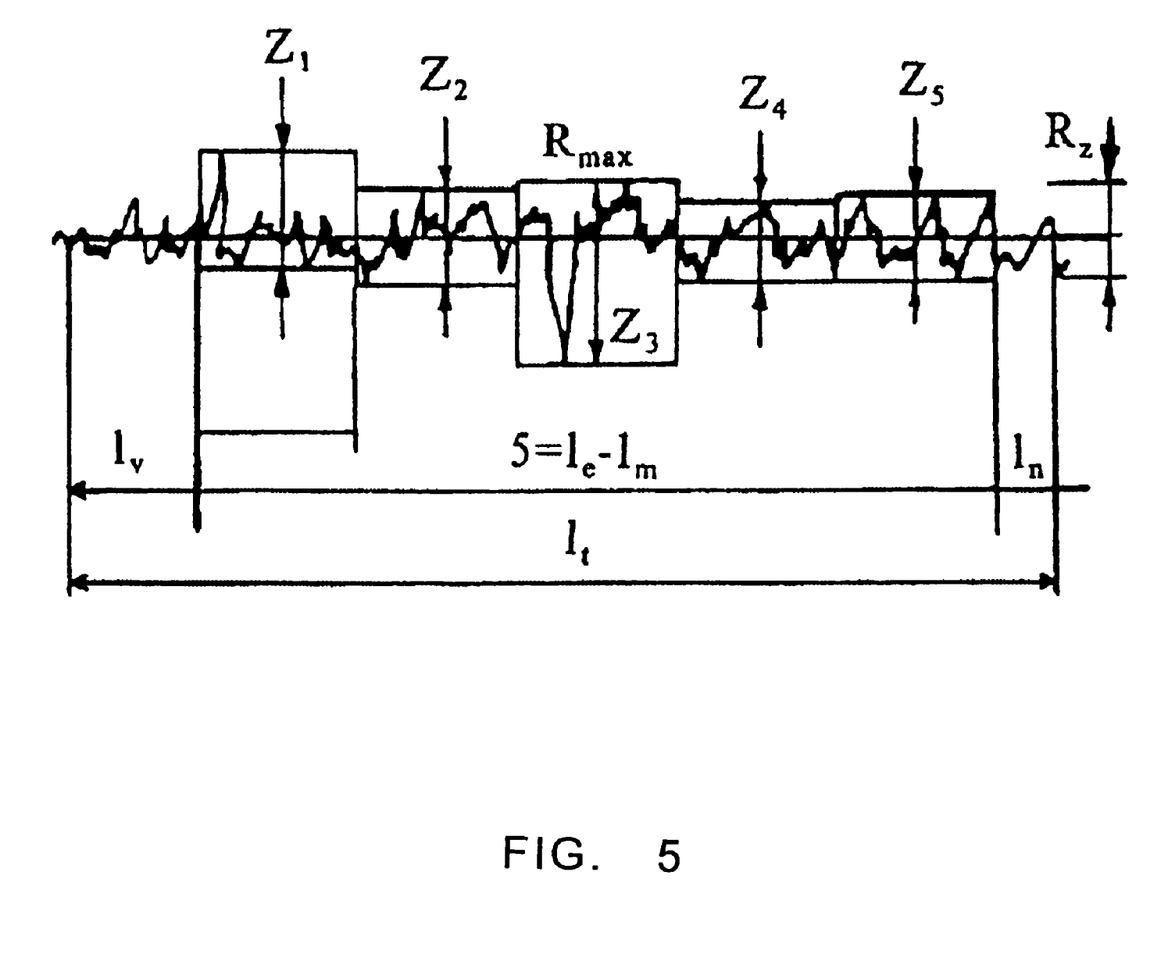
FIG. 5 shows a graph to determine Averaged Depth of Roughness $R_z$, Maximum Depth of Roughness $R_{max}$, and Individual Depth of Roughness $Z_i$ in accordance with DIN 4768.

Scanned length $l_t$. Total of the lead length $l_v$, total measured length $l_m$ and trailing length $l_n$ (FIG. 5).

Definition of boundary wavelength $\lambda_e$—see DIN 4777 Measurement requirements Basically, scanning must be conducted in the direction in which the greatest roughness value is measured. If another direction must be used for operational reasons, the scanning direction must be indicated. On periodic profiles (e.g. lathe turning, planing), the classifications indicated in Table 285.1 apply.

On aperiodic profiles (e.g. grinding, lapping, contour milling, reaming), for the measurement of $R_a$ the classifications in Table 285.2 apply. For the measurement of $R_{max}$ on aperiodic profiles, the boundary wavelength is governed by $R_z$. The total measured length is generally five times the length of the boundary wavelength. However, if the workpiece does not permit the total measured length of $5\lambda_e$, a total measured length of $\lambda_e$ can be used. This must be indicated with the roughness value, e.g. $R_a 1.1=$m at $l_m=3\lambda_e$. If, for special reasons, classifications of the boundary wavelength other than those indicated in Tables 285.1 to 285.3 are necessary, the wavelengths must be indicated with the roughness values, e.g. $R_a 1.1=$m at $l_m=0.25$ mm. The boundary wavelengths and the individual measured distances must always be of equal length.

TABLE 285.1

Classification by distance between grooves

| Distance between grooves (Feed) in mm | $\lambda_e$ in mm | $l_e$ in mm | $l_m$ min. in mm |
|---|---|---|---|
| more than 0.01 to 0.04 | 0.08 | 0.08 | 0.4 |
| more than 0.032 to 0.13 | 0.25 | 0.25 | 1.25 |
| more than 0.1 to 0.4 | 0.8 | 0.8 | 4 |
| more than 0.32 to 1.3 | 2.5 | 2.5 | 12.5 |
| more than 1 to 4 | 8 | 8 | 40 |

Definition of boundary wavelength $\lambda_e$—See DIN 4777

TABLE 285.2

Classification by averaged depth of roughness $R_z$

| $R_z$ in m | $\lambda_e$ in mm | $l_e$ in mm | $l_m$ min. in mm |
|---|---|---|---|
| Up to 0.01 | 0.08 | 0.08 | 0.4 |
| more than 0.01 to 0.5 | 0.25 | 0.25 | 1.25 |
| more than 0.5 to 10 | 0.8 | 0.8 | 4 |
| more than 0.32 to 50 | 2.5 | 2.5 | 12.5 |
| more than 50 | 8 | 8 | 40 |

TABLE 285.3

Classification by mean roughness $R_a$

| $R_a$ in m | $\lambda_e$ in mm | $l_m$ min. in mm |
|---|---|---|
| Up to 0.02 | 0.08 | 0.4 |
| more than 0.02 to 0.1 | 0.25 | 1.25 |
| more than 0.1 to 2 | 0.8 | 4 |
| more than 2 to 10 | 2.5 | 12.5 |
| more than 10 | 8 | 40 |

Appendix to DIN 4768-1 Determination of Surface Roughness of Parameters $R_a$, $R_z$, and $R_{max}$ by means of Electrical Stylus Instruments—Conversion of the measurements $R_a$ to $R_z$ and vice-versa (October 1978)

This Appendix is intended to facilitate the interpretation of the results between plants in which the roughness of the workpiece surface is evaluated on the basis of the averaged depth of roughness $R_z$ and plants that prefer to use the mean roughness $R_a$.

A precise conversion between $R_a$ and $R_z$ and vice-versa cannot be justified theoretically or proven empirically. Each conversion is burdened, as a function of the manufacturing methods, with a relatively large scatter. Therefore a diagram was developed (See FIG. 6), the boundary lines of which represent the range of dispersion in the determination of the $R_a$ or $R_z$ value with a sufficient safety margin.

Figure 6:
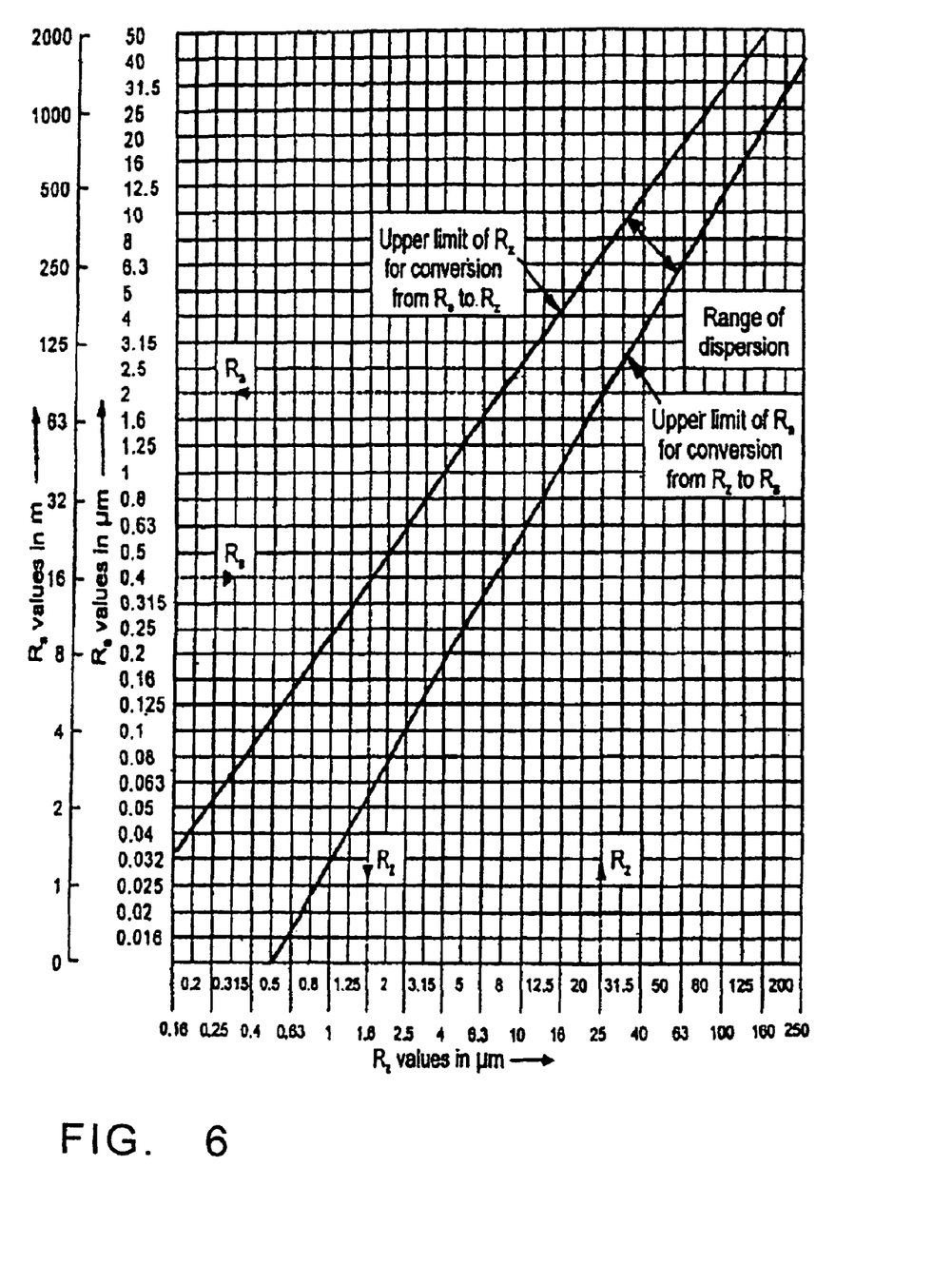
FIG. 6 shows a table for conversion of $R_a$ values into $R_z$ values and vice-versa.

If, for the determination of the upper limit of the $R_z$ value with a specified $R_a$ value, the upper boundary line of the range of dispersion is selected, it can be assumed that the specified $R_a$ value is not exceeded. The same is true for the specified $R_z$ value, if the bottom line is used for the determination of the $R_a$ boundary value. With this conversion rule, the results will in any case be 'on the safe side,' although the result will very frequently be a roughness measurement that is converted with excessive precision, as a result of which the manufacturing may become excessively expensive. Therefore, weighing the risks of error, consideration should be given to whether an orientation toward the middle of the range of dispersion is not better for the conversion. However, this possibility is not taken into consideration in this Appendix."

One feature or aspect of an embodiment is believed at the time of the filing of this patent application to possibly reside broadly in a twist drill 1, in particular for the machining of wrought aluminum alloys, with a drill shaft 2 and a cutting part 3 that extends to a drill tip 6, with spiral chip flutes 4 along the cutting part 3 that form a drill core 15, with a core thickness $D_k$ at the drill tip 6 of (15±3)% of the drill diameter D, with a tapering of the core thickness $D_k$ from the drill tip 6 toward the shaft 2, and with a primary clearance angle $\alpha_1$ of $\alpha_1=(19\pm3)°$ and a secondary clearance angle $\alpha_2$ of $\alpha_2=(26\pm4)°$.

Another feature or aspect of an embodiment is believed at the time of the filing of this patent application to possibly reside broadly in a twist drill 1, in particular for the machining of wrought aluminum alloys, with a drill shaft 2 and a cutting part 3 that extends to a drill tip 6, with spiral chip flutes 4 along the cutting part 3 that form a drill core 15, with a core thickness $D_k$ at the drill tip 6 of (15±3)% of the drill diameter D, with a tapering of the drill diameter D from the drill tip 6 toward the shaft 2, and with a primary clearance angle $\alpha_1$ of $\alpha_1=(19\pm3)°$ and a secondary clearance angle $\alpha_2$ of $\alpha_2=(26\pm4)°$.

Yet another feature or aspect of an embodiment is believed at the time of the filing of this patent application to possibly reside broadly in a twist drill having a twist angle β of β=(30±3)°, preferably β=30°, or β=(40±3)°, preferably β=40°.

Still another feature or aspect of an embodiment is believed at the time of the filing of this patent application to possibly reside broadly in a twist drill comprising at least one lubricant boring 12 that emerges in the vicinity of the drill tip 6.

A further feature or aspect of an embodiment is believed at the time of the filing of this patent application to possibly reside broadly in a twist drill having a tapering of the core thickness $D_k$ and/or of the drill diameter D by (0.7±0.2) with reference to a drill length l of 100 mm.

Another feature or aspect of an embodiment is believed at the time of the filing of this patent application to possibly reside broadly in a twist drill comprising precision-ground surfaces of the cutting part 3, in particular of the chip flutes 4, of the clearance faces 7 and/or of the circular lands 10.

Yet another feature or aspect of an embodiment is believed at the time of the filing of this patent application to possibly reside broadly in a twist drill having an average roughness of $R_A \leq 0.1$.

Still another feature or aspect of an embodiment is believed at the time of the filing of this patent application to possibly reside broadly in a twist drill having a coating, preferably a DLC coating of the chip flutes 4, of the clearance faces 7, 9 and/or of the circular lands 10.

A further feature or aspect of an embodiment is believed at the time of the filing of this patent application to possibly reside broadly in a twist drill having a primary clearance angle of $\alpha_1=(18\pm0.5)°$.

Another feature or aspect of an embodiment is believed at the time of the filing of this patent application to possibly reside broadly in a twist drill having a secondary clearance angle of $\alpha_2=(25\pm0.5)°$.

Yet another feature or aspect of an embodiment is believed at the time of the filing of this patent application to possibly reside broadly in a twist drill having a tip angle γ of γ=(120±5)°, preferably γ=(120±0.5)°.

Still another feature or aspect of an embodiment is believed at the time of the filing of this patent application to possibly reside broadly in a twist drill having a land width B of the cutting land 16 of less than or equal to 50% of the drill diameter D.

One feature or aspect of an embodiment is believed at the time of the filing of this patent application to possibly reside broadly in a twist drill for the machining of aluminum alloys, said twist drill having an overall diameter, said twist drill comprising: a drill shaft configured to be inserted into a tool holder; a drill tip comprising a primary cutting edge; a body portion extending from said shaft to said tip; said body portion comprising spiral chip flutes; said body portion comprising lands disposed between adjacent chip flutes; said lands each comprising a clearance surface and a circular surface, said circular surface precedes said clearance surface in the direction of rotation of the twist drill; said spiral chip flutes together define a central drill core or web portion therebetween having a width; said drill core having a width at the drill tip that is (15±3)° the diameter of the twist drill; one of: said drill core width and the drill diameter tapers or decreases in size from said drill tip toward said shaft; said circular surface and a first plane containing said primary cutting edge and the direction of rotation of the twist drill at a point on said cutting edge together define a primary clearance angle measured in a second plane perpendicular to the first plane; said clearance surface and the first plane together define a secondary clearance angle measured in the second plane; said secondary clearance angle being greater than said primary clearance angle.

Another feature or aspect of an embodiment is believed at the time of the filing of this patent application to possibly reside broadly in the twist drill wherein: said primary clearance angle is (19±3)°; and said secondary clearance angle is (26±4)°.

Yet another feature or aspect of an embodiment is believed at the time of the filing of this patent application to possibly reside broadly in the twist drill wherein: said twist drill has a twist angle of one of: (30±3)°, 30°, (40±3)°, and 40°.

Still another feature or aspect of an embodiment is believed at the time of the filing of this patent application to possibly reside broadly in the twist drill wherein: said twist drill comprises at least one lubricant boring that emerges in the vicinity of the drill tip.

A further feature or aspect of an embodiment is believed at the time of the filing of this patent application to possibly reside broadly in the twist drill wherein: the core width or the drill diameter tapers by (0.7±0.2) mm with reference to a drill length of 100 mm; and at least one of: said body portion, said chip flutes, said clearance surfaces, and said circular surfaces, have precision-ground surfaces having an average roughness of $R_A \leq 0.1$.

Another feature or aspect of an embodiment is believed at the time of the filing of this patent application to possibly reside broadly in the twist drill wherein: at least one of: said chip flutes, said clearance surfaces, and said circular surfaces have a diamond-like carbon coating; and said primary clearance angle is (18±0.5)°.

Yet another feature or aspect of an embodiment is believed at the time of the filing of this patent application to possibly reside broadly in the twist drill wherein: said secondary clearance angle is (25±0.5)°; said twist drill has a tip angle of one of: (120±5)° and (120±0.5)°; and said lands each have a land width of less than or equal to 50% of the drill diameter.

One feature or aspect of an embodiment is believed at the time of the filing of this patent application to possibly reside broadly in a twist drill for the machining of aluminum alloys, said twist drill having an overall diameter, said twist drill comprising: a drill shaft configured to be inserted into a tool holder; a drill tip comprising a primary cutting edge; a body portion extending from said shaft to said tip; said body portion comprising spiral chip flutes; said body portion comprising lands disposed between adjacent chip flutes; said lands each comprising a clearance surface and a circular surface, said circular surface precedes said clearance surface in the direction of rotation of the twist drill; said spiral chip flutes together define a central drill core or web portion therebetween having a width; said drill core having a width at the drill tip that is substantially less than the diameter of the twist drill; one of: said drill core width and the drill diameter tapers or decreases in size from said drill tip toward said shaft; said circular surface and a first plane containing said primary cutting edge and the direction of rotation of the twist drill at a point on said cutting edge together define a primary clearance angle measured in a second plane perpendicular to the first plane; said clearance surface and the first plane together define a secondary clearance angle measured in the second plane; and said secondary clearance angle being greater than said primary clearance angle.

Another feature or aspect of an embodiment is believed at the time of the filing of this patent application to possibly reside broadly in the twist drill wherein: said primary clearance angle is $(19\pm3)°$; and said secondary clearance angle is $(26\pm4)°$.

Yet another feature or aspect of an embodiment is believed at the time of the filing of this patent application to possibly reside broadly in the twist drill wherein: said twist drill has a twist angle of one of: $(30\pm3)°$, $30°$, $(40\pm3)°$, and $40°$.

Still another feature or aspect of an embodiment is believed at the time of the filing of this patent application to possibly reside broadly in the twist drill wherein: said twist drill comprises at least one lubricant boring that emerges in the vicinity of the drill tip.

A further feature or aspect of an embodiment is believed at the time of the filing of this patent application to possibly reside broadly in the twist drill wherein: the core width or the drill diameter tapers by $(0.7\pm0.2)$ mm with reference to a drill length of 100 mm; and at least one of: said body portion, said chip flutes, said clearance surfaces, and said circular surfaces, have precision-ground surfaces having an average roughness of $R_A \leq 0.1$.

Another feature or aspect of an embodiment is believed at the time of the filing of this patent application to possibly reside broadly in the twist drill wherein: at least one of: said chip flutes, said clearance surfaces, and said circular surfaces have a protective coating; and said primary clearance angle is $(18\pm0.5)°$.

Yet another feature or aspect of an embodiment is believed at the time of the filing of this patent application to possibly reside broadly in the twist drill wherein: said secondary clearance angle is $(25\pm0.5)°$; said twist drill has a tip angle of one of: $(120\pm5)°$ and $(120\pm0.5)°$; and said lands each have a land width of less than or equal to 50% of the drill diameter.

The components disclosed in the various publications, disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state "Some examples of . . . which may possibly be used in at least one possible embodiment of the present application . . ." may possibly not be used or useable in any one or more embodiments of the application.

The sentence immediately above relates to patents, published patent applications and other documents either incorporated by reference or not incorporated by reference.

All of the patents, patent applications or patent publications, which were cited in the International Search Report for International Application No. PCT/EP2005/002187, and/or cited elsewhere are hereby incorporated by reference as if set forth in their entirety herein as follows: U.S. Pat Nos. 5,678, 960; 3,387,511; EP0761352; US2003215297; FR2433996; US2003053873; and JP63260713.

The "Technical Reference & Special Services" catalog published by Precision Twist Drill Co. is hereby incorporated by reference herein.

The corresponding foreign and international patent publication applications, namely, Federal Republic of Germany Patent Application No. 20 2004 004 287.8, filed on Mar. 17, 2004, having inventors Wolfgang LANG and Günter SCHREINER, and DE-OS 20 2004 004 287.8 and DE-PS 20 2004 004 287.8, and International Application No. PCT/EP2005/002187, filed on Mar. 2, 2005, having WIPO Publication No. WO2005/092547 and inventors Wolfgang LANG and Günter SCHREINER, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72 (b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

What is claimed is:

1. A twist drill for the machining of aluminum alloys, said twist drill having an overall diameter, said twist drill comprising:
   a drill shaft configured to be inserted into a tool holder;
   a drill tip comprising a primary cutting edge;
   a body portion extending from said shaft to said tip;
   said body portion comprising spiral chip flutes;
   said body portion comprising lands disposed between adjacent chip flutes;
   said lands each comprising a clearance surface and a circular surface,
   said circular surface precedes said clearance surface in the direction of rotation of the twist drill;
   said spiral chip flutes together define a central drill core or web portion therebetween having a width;
   said drill core having a width at the drill tip that is (15±3)% the diameter of the twist drill;
   one of: said drill core width and the drill diameter tapers or decreases in size from said drill tip toward said shaft;
   said circular surface and a first plane containing said primary cutting edge and the direction of rotation of the twist drill at a point on said cutting edge together define a primary clearance angle measured in a second plane perpendicular to the first plane;
   said clearance surface and the first plane together define a secondary clearance angle measured in the second plane; and
   said secondary clearance angle being greater than said primary clearance angle:
   wherein at least one of: said body portion, said chip flutes, said clearance surfaces and said circular surfaces have precision-ground surfaces having an average roughness of $R_A$ less than or equal to 0.1.

2. The twist drill according to claim 1, wherein: said primary clearance angle is (19+/−3)°; and said secondary clearance angle is (26±4)°.

3. The twist drill according to claim 1, wherein said twist drill has a twist angle of one of: (30±3)°, 30°, (40±3)°, and 40°.

4. The twist drill according to claim 1, wherein said twist drill comprises at least one lubricant boring that emerges in the vicinity of the drill tip.

5. The twist drill according to claim 1, wherein: the core width or the drill diameter tapers by (0.7±0.2) mm with reference to a drill length of 100 mm.

6. The twist drill according to claim 1, wherein: at least one of: said chip flutes, said clearance surfaces, and said circular surfaces have a diamond-like carbon coating; and said primary clearance angle is (18±0.5)°.

7. The twist drill according to claim 1, wherein:
said secondary clearance angle is (25±0.5)°;
said twist drill has a tip angle of one of: (120±5)° and (120±0.5)°; and
said lands each have a land width of less than or equal to 50% of the drill diameter.

8. A twist drill for the machining of aluminum alloys, said twist drill having an overall diameter, said twist drill comprising:
a drill shaft configured to be inserted into a tool holder;
a drill tip comprising a primary cutting edge;
a body portion extending from said shaft to said tip;
said body portion comprising spiral chip flutes;
said body portion comprising lands disposed between adjacent chip flutes;
said lands each comprising a clearance surface and a circular surface,
said circular surface precedes said clearance surface in the direction of rotation of the twist drill;
said spiral chip flutes together define a central drill core or web portion therebetween having a width;
said drill core having a width at the drill tip that is substantially less than the diameter of the twist drill;
one of: said drill core width and the drill diameter tapers or decreases in size from said drill tip toward said shaft;
said circular surface and a first plane containing said primary cutting edge and the direction of rotation of the twist drill at a point on said cutting edge together define a primary clearance angle measured in a second plane perpendicular to the first plane;
said clearance surface and the first plane together define a secondary clearance angle measured in the second plane; and
said secondary clearance angle being greater than said primary clearance angle;
wherein at least one of: said body portion, said chip flutes, said clearance surfaces and said circular surfaces have precision ground surfaces having an average roughness of $R_A$ less than or equal to 0.1.

9. The twist drill according to claim 8, wherein: said primary clearance angle is (19±3)°; and said secondary clearance angle is (26±4)°.

10. The twist drill according to claim 8, wherein said twist drill has a twist angle of one of: (30±3)°, 30°, (40±3)°, and 40°.

11. The twist drill according to claim 8, wherein said twist drill comprises at least one lubricant boring that emerges in the vicinity of the drill tip.

12. The twist drill according to claim 8, wherein: the core width or the drill diameter tapers by (0.7±0.2) mm with reference to a drill length of 100 mm.

13. The twist drill according to claim 8, wherein: at least one of: said chip flutes, said clearance surfaces, and said circular surfaces have a protective coating; and said primary clearance angle is (18+0.5)°.

14. The twist drill according to claim 8, wherein: said secondary clearance angle is (25+/−0.5)°; said twist drill has a tip angle of one of: (120±5)° and (120±0.5)°; and said lands each have a land width of less than or equal to 50% of the drill diameter.

15. A twist drill (1), in particular for the machining of wrought aluminum alloys, with a drill shaft (2) and a cutting part (3) that extends to a drill tip (6), with spiral chip flutes (4) along the cutting part (3) that form a drill core (15), with a core thickness ($D_k$) at the drill tip (6) of (15±3) % of the drill diameter (D), with a tapering of one of: the core thickness ($D_k$) and the drill diameter (D) from the drill tip (6) toward the shaft (2), and with a primary clearance angle ($\alpha_{-1}$) of $\alpha_1=$(19±3)° and a secondary clearance angle ($\alpha_{-2}$) of $\alpha_2=$(26±4)° and clearance faces (7) and circular lands (10); and wherein: at least one of: the cutting part (3), the chip flutes (4), the clearance faces (7) and the circular lands (10) have precision-ground surfaces having an average roughness of $R_A$ less than or equal to 0.1.

16. The twist drill according to claim 15, wherein said twist drill has a twist angle (β) of one of: β=(30±3)°, β=30°, β=(40±3)°, and β=40°.

17. The twist drill according to claim 15, wherein: said twist drill comprises at least one lubricant boring (12) that emerges in the vicinity of the drill tip (6); and the core thickness ($D_k$) or the drill diameter (D) tapers by (0.7±0.2) mm with reference to a drill length (l) of 100 mm.

18. The twist drill according to claim 15, wherein: at least one of: the chip flutes (4), the clearance faces (7, 9), and the circular lands (10) have a DLC coating; and the primary clearance angle ($\alpha_1$)=(18±0.5)°.

19. The twist drill according to claim 15, wherein: the secondary clearance angle ($\alpha_2$)=(25±0.5)°; said twist drill has a tip angle (γ) of one of: γ=(120±5)° and γ=(120±0.5)°; and said twist drill has a land width (B) of the cutting land (16) of less than or equal to 50% of the drill diameter (D).

* * * * *